United States Patent [19]
Fujimura et al.

[11] Patent Number: 4,647,156
[45] Date of Patent: Mar. 3, 1987

[54] LIQUID CRYSTAL DEVICE

[75] Inventors: Koh Fujimura; Hisashi Aoki, both of Tokyo, Japan

[73] Assignee: Casio Computer Co., Ltd., Tokyo, Japan

[21] Appl. No.: 719,708

[22] Filed: Apr. 4, 1985

[30] Foreign Application Priority Data

Apr. 12, 1984 [JP] Japan .................................. 59-71735
Jul. 27, 1984 [JP] Japan ........................... 59-113438[U]
Jul. 27, 1984 [JP] Japan ........................... 59-113439[U]

[51] Int. Cl.⁴ ............................................. G02F 1/133
[52] U.S. Cl. ................................................. 350/339 R
[58] Field of Search ............................. 350/334, 339 R

[56] References Cited

U.S. PATENT DOCUMENTS

| | | | |
|---|---|---|---|
| 4,252,414 | 2/1981 | Kinugawa et al. | 350/339 R |
| 4,370,028 | 1/1983 | Bernhardt | 350/334 X |
| 4,386,836 | 6/1983 | Aoki et al. | 355/3 R |
| 4,387,965 | 6/1983 | Hara | 350/339 R X |
| 4,529,272 | 7/1985 | Krüger et al. | 350/339 R |
| 4,569,574 | 2/1986 | Masaki et al. | 350/339 R X |

Primary Examiner—Donald A. Griffin
Attorney, Agent, or Firm—Frishauf, Holtz, Goodman & Woodward

[57] ABSTRACT

A liquid crystal device of the present invention has a pair of liquid crystal substrates opposed to each other. A plurality of signal electrodes are formed on the inner surface of one of the paired liquid crystal substrates. Two scanning electrodes are formed on the inner suface of the other paired liquid crystal substrates. A liquid crystal material is interposed between the substrates. The liquid crystal material, signal electrodes and scanning electrodes form liquid crystal light shutters. The liquid crystal material is sealed only in a liquid crystal shutter section where the shutters are formed, so as to reduce capacitance between the signal and scanning electrodes. Materials which have a small dielectric constant are sealed in an area where the shutters are not formed between the signal and scanning electrodes.

13 Claims, 11 Drawing Figures

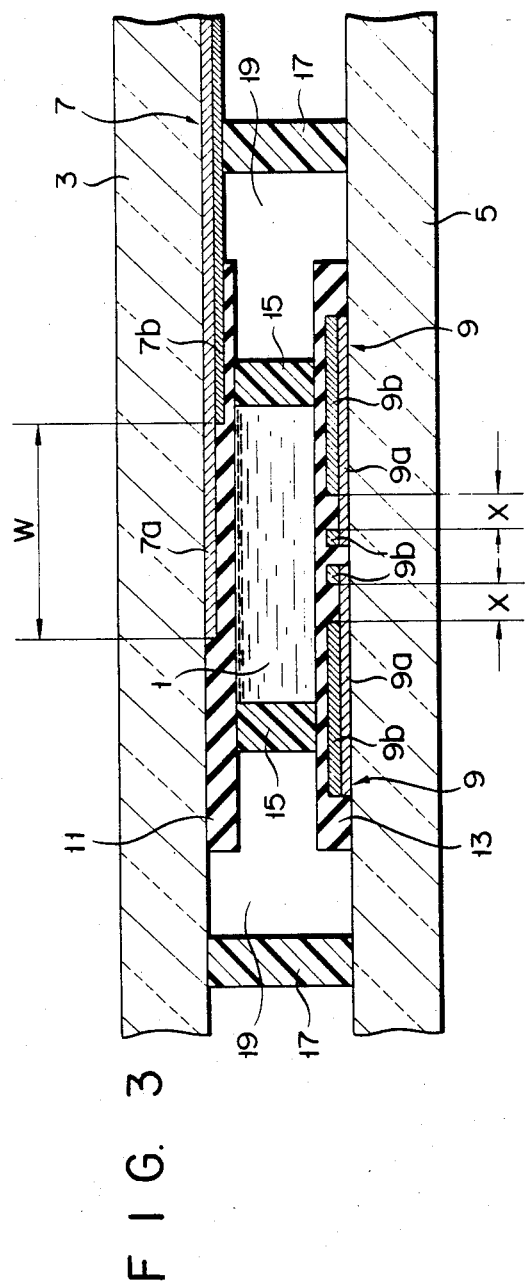
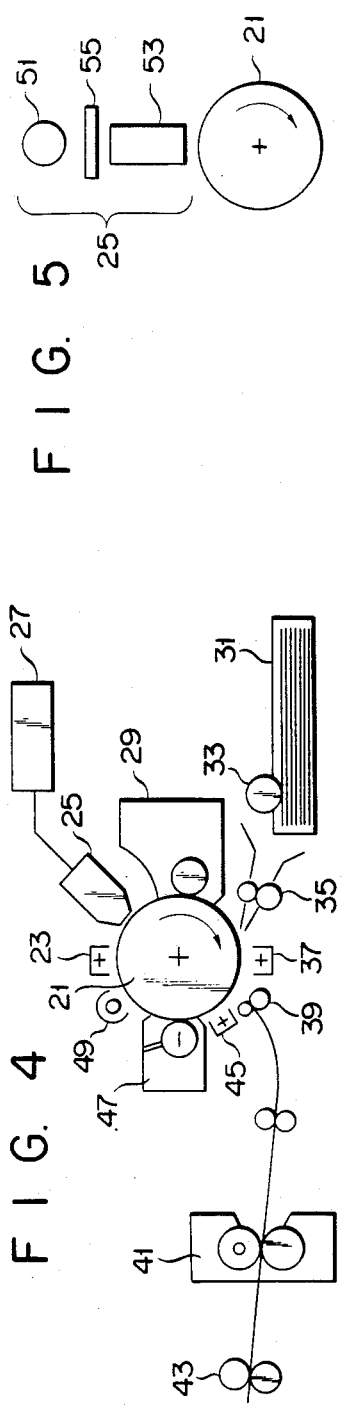
FIG. 3
FIG. 4
FIG. 5

LIQUID CRYSTAL DEVICE

BACKGROUND OF THE INVENTION

The present invention relates to an improvement of the liquid crystal device which operates at high speed and, more particularly, it relates to an improvement of the liquid crystal device which is driven according to the two-frequency addressing scheme.

The liquid crystal device is in use currently as the image display device for a television receiver, computer display and the like. It has also been employed by the so-called electrophotographic printer, as disclosed by U.S. Pat. No. 4,386,836, for example. This liquid crystal device which has been used for image display or with an electrophotographic printer has the following general arrangement in. A pair of substrates are arranged opposite to each other, sandwiching a liquid crystal material between them. A plurality of signal electrodes are provided on the inner face of one of the substrates, and a plurality of scanning electrodes are provided on the inner face of the other substrate, thereby forming a plurality of light shutters (microshutters) which serve to switch light on and off. These shutters comprise a part of that area where the signal and scanning electrodes are opposed to one another with the liquid crystal interposed between them. The liquid crystal material is sealed by a sealing member, which is formed along the outline of the paired substrates.

A liquid crystal device having the above-described arrangement may in some situations, need to be driven at high frequency to have high contrast. The two-frequency addressing scheme is used in this case. This two-frequency addressing scheme uses the dielectric dispersion phenomenon of liquid crystal. The two-frequency driving liquid crystal is used in the case of employing this two-frequency addressing scheme. This two-frequency driving liquid crystal has the property of changing its dielectric anisotropy positive and negative, depending upon the frequency of alternating electric field applied. As shown in FIG. 1, it is assumed that the frequency of an alternating electric field at which the dielectric anisotropy $\Delta\epsilon$ of the liquid crystal becomes zero is fc. When an alternating electric field having a frequency fL lower than the frequency fC is applied, the liquid crystal material shows positive dielectric anisotropy $\Delta\epsilon L$ and the molar axes of the liquid crystal become parallel to the electric field. When an alternating electric field having a frequency fH higher than the frequency fC is applied, the liquid crystal shows negative anisotropy $\Delta\epsilon H$ and the molar axes of the liquid crystal become perpendicular to the electric field. As described above, the two-frequency addressing scheme is intended to selectively operate molecules of liquid crystal by selectively applying the alternating electric fields of low and high frequencies to the liquid crystal material. As a result, the amount of light passing through the shutters can be controlled.

A case where the two-frequency addressing scheme is applied to the liquid crystal device of the positive display TN type will be described. The liquid crystal device of the positive display TN type is of the twisted nematic mode wherein polarization axes of polarizer are arranged perpendicular to one another. When a voltage having the low frequency fL is applied between the signal and scanning electrodes, the molar axes of liquid crystal become perpendicular to the electrode face. The shutters thus shut off light and are turned off. When a voltage having the high frequency fH is applied between the signal and scanning electrodes, the molar axes of liquid crystal become twisted and parallel to the electrode face. The shutters thus allow light to pass therethrough and are turned on.

Another case where the two-frequency addressing scheme is applied to the liquid crystal device of the G-H mode (or Gest-Host effect mode) will be described. When the voltage of low frequency fL is applied between the electrodes, the molar axes of liquid crystal become perpendicular to the electrodes and the axes of dichroic dye which moves together with the molecules of liquid crystal also become perpendicular to the electrodes. Therefore, the dichroic dye absorbs no light and the shutters turn on, allowing light to pass therethrough. When the voltage of high frequency fH is applied between the electrodes, the molar axes of liquid crystal become parallel to the electrode face and those of dichroic dye thus become parallel to the electrode face, thereby absorbing light in a wavelength band particularly to the dye. Therefore, the shutters turn off, shutting off the light with this specific wavelength band.

In the above-described liquid crystal devices, the area of the portions which forms the plural microshutters among the electrodes is extremely small. The size of each of the shutters is 0.1 mm×0.1 mm, for example. However, the area of another portion except that one which forms the plural micro-shutters among the electrodes is large. The area of lead portion, for example, which serves to supply power to the shutters is large because the pattern width of the electrodes cannot be made narrower to keep the resistance value of the electrodes small. In addition, the liquid crystal material which has a large dielectric constant is interposed between the signal and scanning electrodes. Electrostatic capacitance which exists between both of these electrodes is thus extremely large. When a voltage having a high frequency is applied between both of these electrodes, therefore, large current is allowed to flow through the capacitance which is provided by both of these electrodes. On the other hand, the shape of the electrodes cannot be made so large from the viewpoint of space and without increasing the capacitance between both of the electrodes and it is therefore difficult to make the resistance value of the electrodes sufficiently small. Accordingly, the conventional liquid crystal devices which employed the two-frequency addressing scheme had such a drawback that their lead portions were heated. If the number of the signal electrodes is large, the amount of current flowing through the scanning electrodes is large even when the amount of current flowing through the signal electrodes is small. Therefore, the heat value was extremely large on the power side of the scanning electrodes.

Further, the liquid crystal material was deteriorated by the heat generated in the conventional liquid crystal devices. In addition, the operation characteristics of the liquid crystal material was changed by the heat generated. Particularly in the case where the liquid crystal devices are driven according to the two-frequency addressing scheme, the crossover frequency fC is changed to a great extent when the temperature of the liquid crystal material is raised. The dielectric anisotropies $\Delta\epsilon L$ and $\Delta\epsilon H$ in relation to the low and high frequencies fL and fH are thus changed to a great extent, so that the liquid crystal devices cannot be driven stably. In addition, their response speed and contrast are reduced. The turning on and off of the shutters sometimes cannot be controlled.

SUMMARY OF THE INVENTION

The object of the present invention is to provide a liquid crystal device wherein the capacitance which exists between the signal and scanning electrodes is small.

This object of the present invention can be achieved by a liquid crystal device comprising a pair of liquid crystal substrates (3, 5) opposed to each other; at least one first electrode (7) formed on the inner surface of one (3) of the paired liquid crystal substrates (3, 5); at least one second electrode (9) formed on the inner surface of the other (5) of the paired liquid crystal substrates (3, 5); a liquid crystal material (1) interposed between the paired substrates (3, 5) and forming at least one light shutter for cooperating with a part of that portion where the first and second electrodes (7) and (9) are overlapping each other, thereby controlling the amount of light penetrated; a sealing member (17) formed enclosing at least that area which is filled with the liquid crystal material (1) between the paired substrates (3, 5); and a means arranged at a part between these portions other than those ones where the first and second electrodes (7, 9) form the light shutter, and including at least a material which has a dielectric constant smaller than that of said liquid crystal material, to thereby reduce the electrostatic capacitance between the first and second electrodes (7, 9).

When arranged as described above, the liquid crystal device of the present invention has the following effects. The capacitance between the first and second electrode means can be reduced as compared with the conventional cases. When high frequency voltage is applied between the first and second electrode means, therefore, the value of current which flows through the capacitance provided by the electrode means can be made smaller as compared with the conventional cases. The value of current which flows through the electrode means becomes smaller accordingly and the amount of heat generated by the electrode means can be thus made smaller as compared with the conventional cases. Therefore, the operation characteristics of said liquid crystal device is not changed and the liquid crystal material is not deteriorated, too, because of heat generated. In addition, the operation speed of this liquid crystal device can be enhanced since the capacitance is made smaller.

BRIEF DESCRIPTION OF THE DRAWINGS

FIG. 3 is a sectional view taken along a line III—III in FIG. 2;

FIG. 4 shows an arrangement of the light writing printer;

FIG. 5 shows the arrangement of the light writing section in FIG. 4;

DETAILED DESCRIPTION OF THE PREFERRED EMBODIMENT

Figure 1:
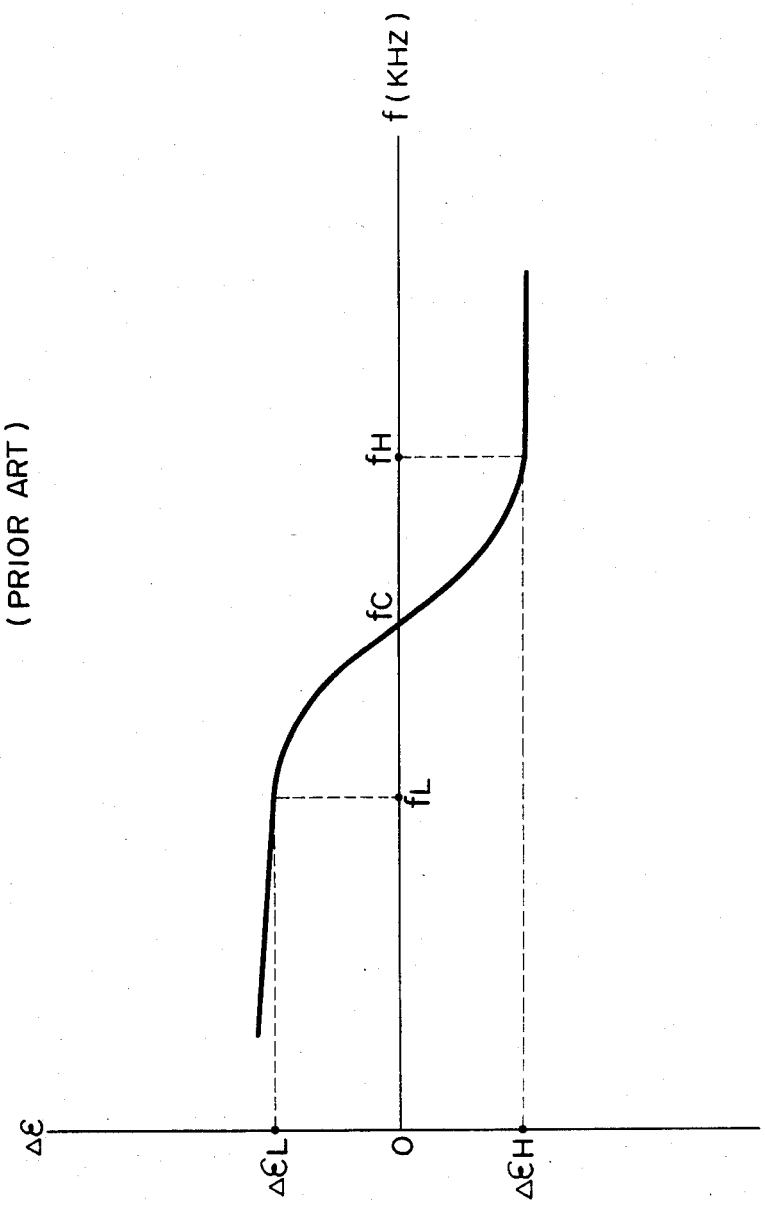
FIG. 1 is a graph showing the relation between frequencies of an alternating electric field applied to the liquid crystal material and dielectric anistropies of the liquid crystal material.
Figure 2:
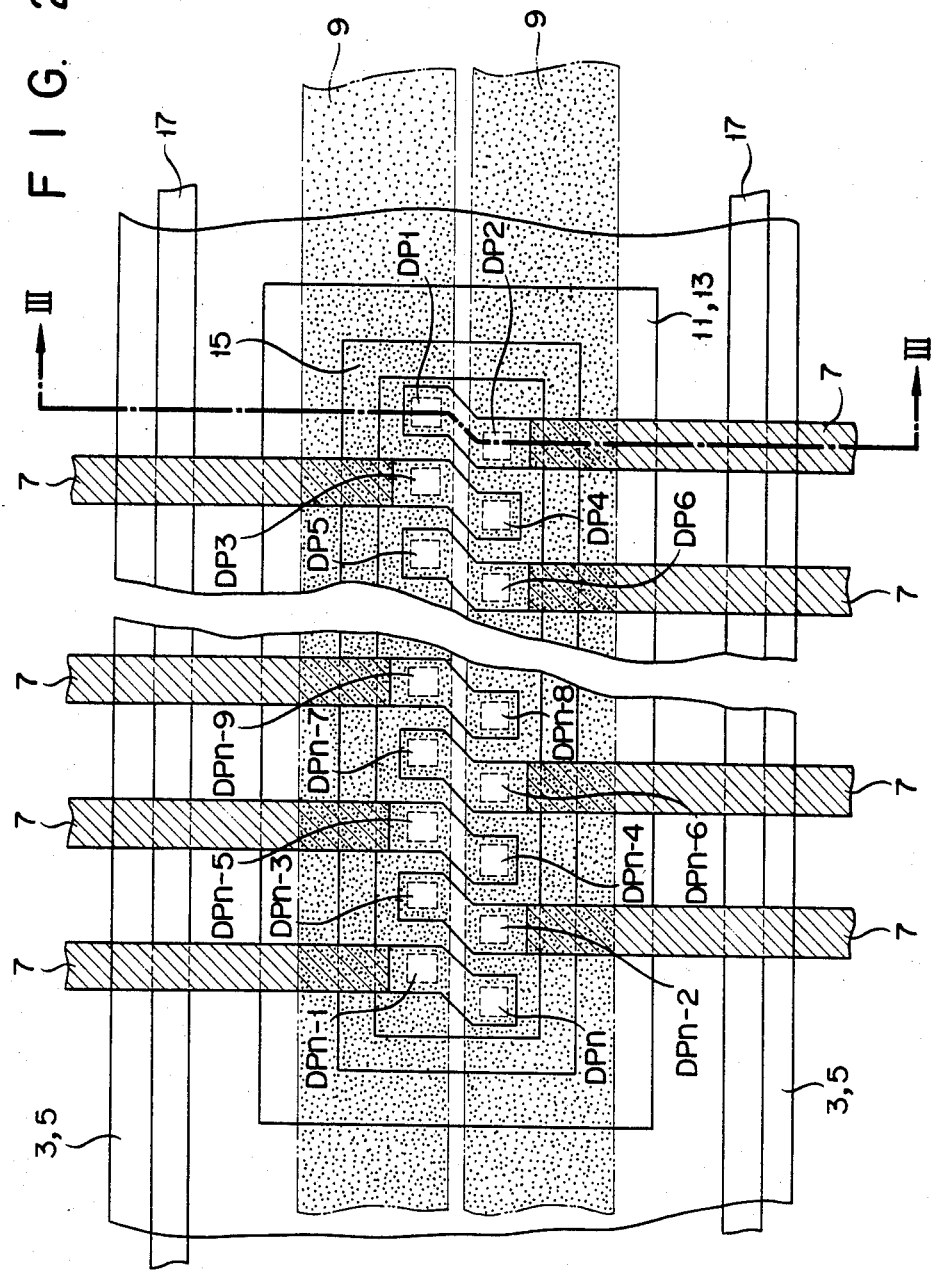
FIG. 2 is a plan view, which is partially broken, of the first embodiment of the liquid crystal device according to the present invention.

A first embodiment of the present invention wherein a liquid crystal of the Gest-Host mode is employed will be described referring to FIGS. 2 and 3. FIG. 2 is a plan view of the positional relation of parts which form the first example of the liquid crystal device. For the sake of explaining these parts, hatching and dots are used. In addition, those parts which are believed unnecessary to explain the embodiment are omitted.

In the first embodiment, it is assumed for the clarity of explanation that light shutters (or liquid crystal shutters or micro-shutters) DP1-DPn (n represents a positive integer, for example, 1300) are arranged in two rows. It is also assumed that a liquid crystal material 1 is of the Gest-Host mode wherein a dichroic dye is dissolved in the two-frequency driving liquid crystal material.

A pair of transparent substrates, (for example, glasses) 3 and 5 are arranged sandwiching the liquid crystal material 1 between them (FIG. 3). A plurality of signal electrodes 7 are provided on that inner surface of one 3 of the paired glass substrates which faces the other glass substrate 5. The signal electrodes 7 extend in the vertical direction in FIG. 2. Only 8 of the signal electrodes 7 are shown in FIG. 2. The foremost end portions of these signal electrodes 7 are put on two scanning electrodes 9. The plural scanning electrodes 9 are provided on that inner surface of the other substrate 5 (which faces the one 3). The scanning electrodes 9 extend in the horizontal direction in FIG. 2. The two scanning electrodes 9, for example, are arranged in the case of the embodiment.

The signal electrodes 7 have a transparent conductive layer 7a which is coated on the inner surface of the substrate 3. A conductive metal layer 7b is formed on the conductive layer 7a. Similarly, the scanning electrodes have a transparent conductive layer 9a which is coated on the inner surface of the other substrate 5. A conductive metal layer 9b is formed on the conductive layer 9a. These conductive metal layers 7b and 9b are intended to keep the resistance values of the electrodes 7 and 9 small. The conductive metal layers 7b and 9b also serve to optically mask that portion in which the shutters DP1-DPn are not included. The conductive metal layer 7b corresponds to those portions which are hatched in FIG. 2. Namely, the metal layer 7b is formed excluding the foremost end portions of the signal electrodes 7 (which correspond to a portion represented by a letter W in FIG. 3). Therefore, the foremost end portions of the signal electrodes 7 are formed only by the transparent electrode 7a, allowing light to pass therethrough. The conductive metal layer 9b is formed at that portion which is dotted in FIG. 2. Namely, the conductive metal layer 9b overlaps the signal electrodes 7 and is formed excluding those portions where the micro-shutters DP1-DPn are formed. The conductive metal layer 9b is formed excluding those portions represented by letters X in FIG. 3. The value of this X is set at 100 μm.

The shutters DP1-DPn are formed by liquid crystal material 1 and the transparent portions of the signal and scanning electrodes 7, 9 where portions overlap. The portion in which the shutters DP1-DPn are included and which is adjacent to the shutters is defined as a shutter portion.

An insulating layer 11 is formed covering the signal electrodes 7. Another insulating layer 13 is also formed covering the scanning electrodes 9. It is preferable that these insulating layers 11 and 13 are made of a material such as polyimide resin which has a small relative dielectric constant. An aligning treatment for making the liquid crystal molecular arrangement homogeneous is applied to the surfaces of the insulating layers 11 and 13. An inner sealing member 15 which seals the liquid crystal material 1 is provided on the scanning electrodes 9 between the glass substrates 3 and 5. The inner sealing member 15 is formed enclosing the shutter portion. An outer sealing member 17 is provided at the circumferential edge portion between the paired glass substrates 3 and 5, enclosing the inner sealing member 15. These inner and outer sealing members 15 and 17 are made of a material such as epoxy resin which has a small relative dielectric constant. The liquid crystal material 1 fills a space which is formed by the inner sealing member 15 and substrates 3 and 5. Air is sealed in another space which is formed by the inner and outer sealing members 15, 17 and substrates 3, 5.

When a signal of low frequency is applied between the signal and scanning electrodes 7 and 9, the axes of liquid crystal molecules are arrayed in the direction of the electric field. The axes of dichroic dye molecules are also arrayed in the direction of the electric field, following the movement of the liquid crystal molecules. Therefore, the dichroic dye absorbs no light. The shutters DP1-DPn are turned on, allowing light to pass therethrough. When a signal of high frequency is applied between the electrodes 7 and 9, the axes of the liquid crystal molecules are arrayed in a direction perpendicular to the electric field. Following the movement of the liquid crystal molecules, the molar axes of the dichroic dye molecules are arrayed in the direction perpendicular to the electric field. The dichroic dye thus absorbs light which has a specific wavelength. Since the wavelength of incident light is accorded with the wavelength band of that light which is absorbed by the dichroic dye, the shutters DP1-DPn are turned off, shutting off the incident light. In the vicinity of the shutters DP1-DPn (shutter portion), there is the same amount of liquid crystal material 1 as in conventional devices. Accordingly, the shutters DP1-DPn can control light penetration the same as conventional micro-shutters.

In this embodiment, the liquid crystal material 1 exists only at the shutter portion. Namely, it exists only in a region which is defined by the inner sealing member 15. Therefore, the capacitance which exists between the signal and scanning electrodes 7 and 9 shows no change at the shutter portion as in the conventional cases. However, air 19 ( whose relative dielectric constant is 1) exists outside the shutter portion (between the inner and outer sealing members 15 and 17). The capacitance which exists between the signal and scanning electrodes 7 and 9 is small between the inner and outer sealing members 15 and 17. Therefore, the total value of the capacitance which exists between the signal and scanning electrodes 7 and 9 becomes substantially smaller as compared with the conventional cases. Accordingly, the amount of current which flows through the capacitance between the signal and scanning electrodes 7 and 9 is small even when voltage of high frequency is applied between the electrodes 7 and 9. The amount of current which flows through the electrodes 7 and 9 is reduced accordingly. Joule heat generated by the electrodes 7 and 9 decreases greatly (heat value is proportional to the square of current value), thereby suppressing the generation of heat.

Using the liquid crystal device which had the above-described double sealing members 15 and 17, a test was conducted to confirm an effect achieved by the liquid crystal device. The test was conducted, comparing this example of the liquid crystal device with the conventional one which has a single sealing member. The conditions under which the test was conducted were as follows. The two-frequency driving liquid crystal was used as the liquid crystal material. Temperature was measured at those end portions of the scanning electrodes which were located on the power side, because all current which flows through the electrodes 7 join at those end portions of the scanning electrodes 9 and heat value is therefore the largest. The entire length of the liquid crystal device was set at 15 cm, size of each of the shutters was 100 μm × 100 μm (in a stagger array), number of the signal electrodes was 650, width of the signal electrode was 180 μm, number of the scanning electrodes was 2, width of the scanning electrode was 3 mm, number of the shutters was 1300, relative dielectric constant of the liquid crystal material was 8, interval of the inner sealing member was 15 (or width of the liquid crystal material filled) 1 mm, and interval of the outer sealing member was 8; 4 mm. A square wave of 300 Hz at 25 V was used as the signal which was applied between the electrodes 7 and 9. All of the shutters were operated simultaneously. The liquid crystal device was fixed in an isothermal vessel at 40° C.

Temperature was repeatedly measured under the above conditions. The following result was obtained in the situation under which balance was held between heat generated and heat released.

Temperature rise with this example of the liquid crystal device which had the double sealing members: 15° C.

Temperature rise with the conventional one which has the single sealing member: 66° C.

The temperature rise in the case of this example is less than ¼ as compared with that in the conventional one. As apparent from the test, it has been confirmed that this example of the liquid crystal device has excellent advantage, as compared with the conventional one.

When voltage of high frequency is applied between the signal and scanning electrodes 7 and 9, heat generated by the electrodes 7 and 9 is small in the case of this example of the liquid crystal device. The change of operation characteristics and deterioration of the liquid crystal material 1 because of the heat generated can be prevented accordingly. It is unnecessary to use expensive material such as gold in order to make the resistance values of the scanning and signal electrodes 9 and 7 small. The electrodes 9 and 7 which have such relatively simple structure that the usual conductive metal bodies 7b and 9b are formed on the transparent electrode layers 7a and 9a can be used. The amount of the liquid crystal material used is less and it is therefore more economical, as compared with the liquid crystal device which is designed to have a single sealing member. In addition, the outer sealing member 17 is formed enclosing the inner sealing member 15, thereby preventing dust, dirt and the like from entering into the air layer 19. The signal and scanning electrodes 7 and 9 can be thus prevented from shorting. Further, structural strength can be increased to add durability. Furthermore, since the capacitance between the signal and scanning electrodes 7 and 9 is made smaller, the rising of pulse voltage applied between both of the electrodes becomes faster, thereby enabling the response speed of liquid crystal to become higher.

Although air 19 has been interposed between the inner and outer sealing members 15 and 17 in this example, the present invention is not limited to it. Other materials which have a dielectric constant smaller than that of the liquid crystal material 1 may be used instead of the air 19. Although the conductive metal layers 7b and 9b have been used to mask light at those portions in which the shutters are not included, the substrates 3 and 5 may be masked instead.

The liquid crystal device of the present invention can be applied to the so-called electrophotographic printer. The electrophotographic printer which will be cited herein is of such a type that letters and the like are printed according to the following process. The shutters of the liquid crystal device are opened and closed to control light entering from a light source and form a latent image of dots on a sensitive body. The latent image is then developed to a visible image, which is transferred on a sheet of transferring paper.

A concrete case where the first example of the liquid crystal device is applied to the electrophotographic printer will be described. At first, the arrangement of the electrophotographic printer will be described referring to FIG. 4. A charger 23 is located adjacent to a photosensitive drum 21. The charger 23 electrifies the surface of the photosensitive drum 21 uniformly. A light writting section 25 carries out light writing on the surface of the photosensitive drum 21 which has been electrified. A control section 27 controls the operation of the light writting section 25 in response to such writting information as images supplied from the outside. The light writting section 25 irradiates light dots on the surface of the photosensitive drum 21. Charge on that surface area of the photosensitive drum 21 which has been irradiated by light is erased. An electrostatic latent image of dots is thus formed on the surface of the photosensitive drum 21. The electrostatic latent image is developed by a developing means 29 to form a toner image.

Sheets of paper 31 are supplied by a roller 33. The paper 31 supplied is temporarily stopped by a retainer roller 35. The paper 31 is fed to a transfer section 37, synchronizing with the toner image on the surface of the photosensitive drum 21. The toner image is transferred onto the paper 31 at the transfer section 37. The paper 31 is separated from the photosensitive drum 21 at a separator section 39. The paper 31 has the toner image fixed thereon by a fixing means 41 and is then discharged outside through rollers 43. After the toner image is transferred on the paper 31, toner on the photosensitive drum 21 is electrically neutralized by an eraser 45. Still-remaining toner is then cleaned by a cleaner 47. The surface of the photosensitive drum 21 is further electrically neutralized by an eraser 49.

As shown in FIG. 5, the light writing section 25 comprises a light source 51, light writing liquid crystal device 55 and imaging lens 53. When the shutters of the liquid crystal device 55 are turned on, light from the light source 51 is irradiated onto the surface of the photosensitive drum 21 through the imaging lens 53. When the liquid crystal shutters of the liquid crystal device 55 are off, the light from the light source 51 is shielded by the shutters and does not come to the photosensitive drum 21.

Figure 6:
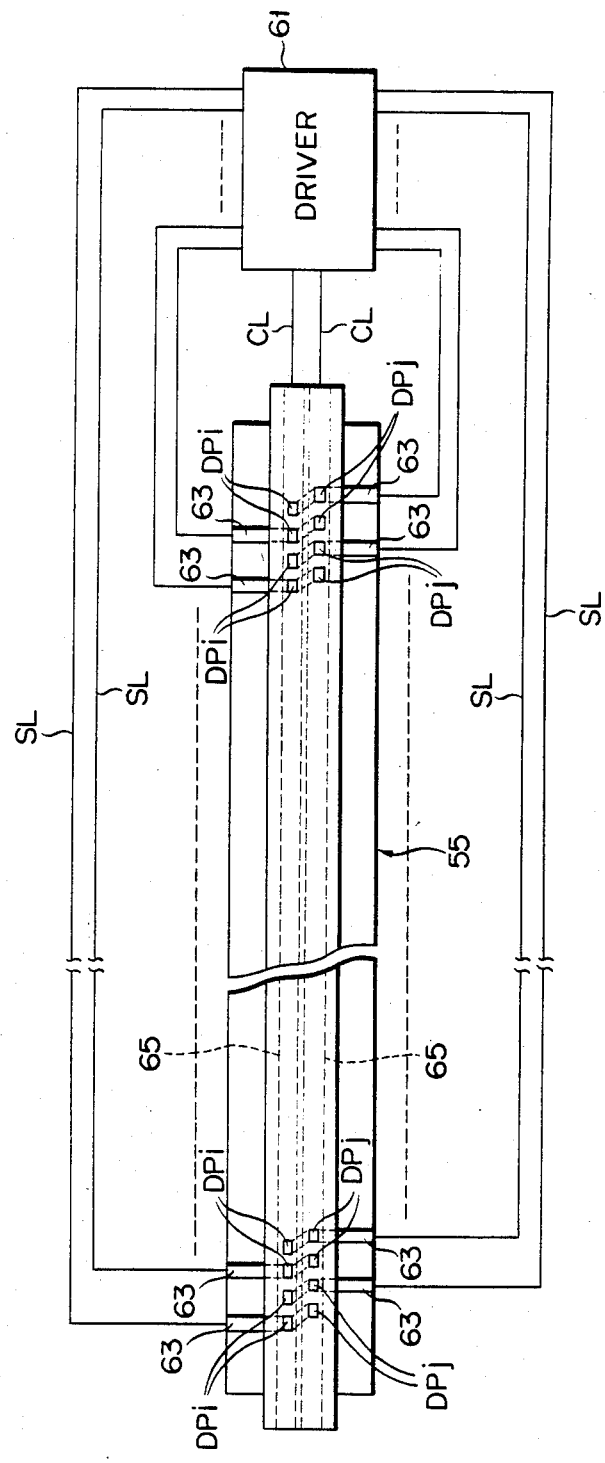
FIG. 6 is a plan view of the arrangement of the liquid crystal device shown in FIG. 4.

As shown in FIG. 6, the liquid crystal device 55 is made longer along the axial direction of the photosensitive drum 21. A plurality of micro-shutters which control the penetration of light are densely arranged on the liquid crystal device 55 along the longitudinal direction thereof.

These shutters are arranged in two rows, for example. The shutters DPi in one row are shifted by ½ pitches from shutters DPj in the other row. The reason why the shutters DPi and DPj are shifted by ½ pitches from one another and arranged in two rows resides in that every interval between dots which have been irradiated by the light passing through the shutters DPi in one row is irradiated by the light passing through the shutters DPj in the other row. When the shutters in one row are shifted by ½ pitches from those in the other row, the electrostatic latent image which is formed by a high density of dots can be provided on the surface of the photosensitive drum 21.

Figures 7A, 7B:
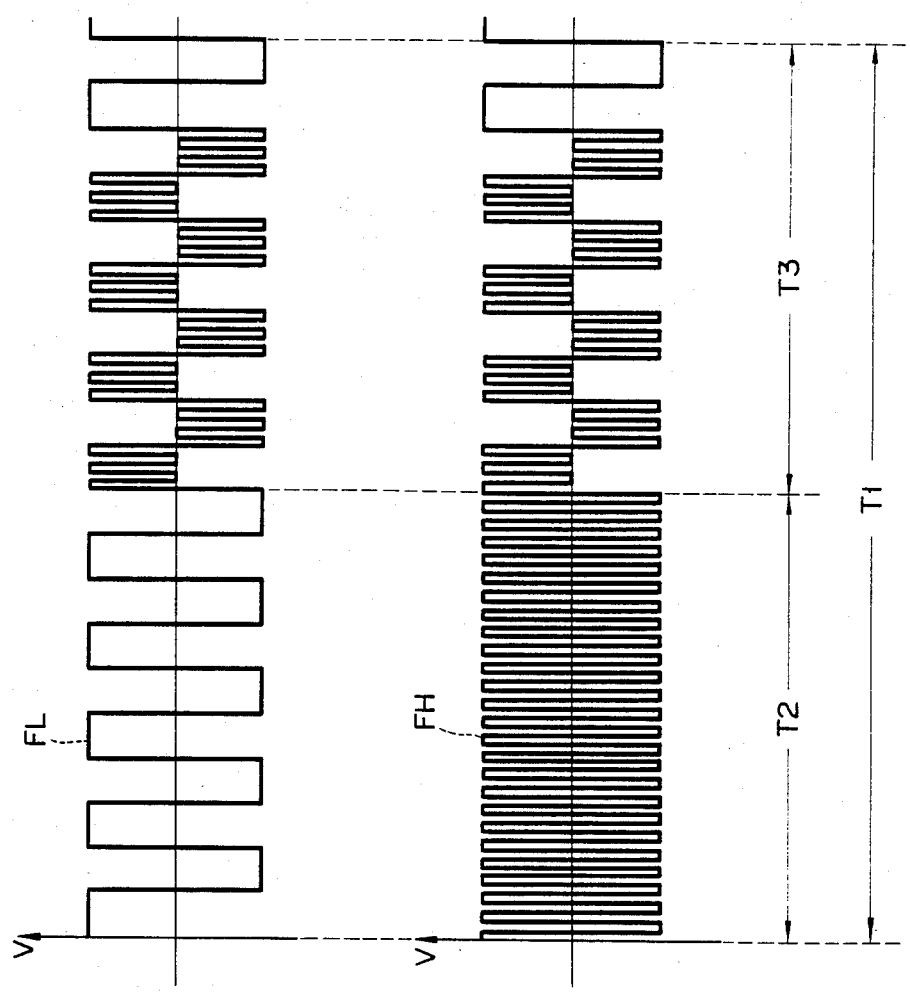
FIGS. 7A and 7B show the waveforms of voltages applied between the signal and scanning electrodes of the liquid crystal device shown in FIG. 6.

Signal electrodes (segment electrodes) 63 and two scanning electrodes (common electrodes) 65 are arranged on the liquid crystal device 55, as shown in FIG. 6. The signal electrodes 63 are connected to a driver circuit 61 through signal lines SL. The scanning electrodes 65 are connected to the driver circuit 61 through signal lines CL. The driver circuit 61 applies alternating voltage between the signal and scanning electrodes 63 and 65 to drive the shutters DPi and DPj. More specifically, voltages having waveforms as shown in FIGS. 7A and 7B are applied between the signal and scanning electrodes 63 and 65. In a case where the shutters DPi and DPj are to be turned on (light is penetrated), the driving voltage having a waveform as shown in FIG. 7A is applied between the electrodes 63 and 65. When the shutters are turned off (light is not penetrated), the driving voltage having a waveform as shown in FIG. 7B is applied between the electrodes 63 and 65 which correspond to each other. The voltage waveforms shown in FIGS. 7A and 7B are a cycle to control the shutters DPi and DPj. The shutters DPi and DPj are opened by an alternating voltage fL having a low frequency, when they are closed by an alternating high frequency voltage fH. Further, they are held opened or closed by a voltage which is superposed by the low and high frequencies fL and fH. They are controlled according to the time division manner on the basis of data such as letters inputted into the driver circuit 61. For example, the shutters DPi in the first row are driven while those DPj in the second row are held during a time period T2 shown in FIG. 7. The shutters DPj in the second row are then driven while those DPi in the first row are held during a time period T3. The light from the light source 51 is thus irradiated onto the photosensitive drum 21, as light dots which represent letters and the like, to thereby form the electrostatic latent image on the photosensitive drum 21. This electrostatic latent image is then fixed, as a visible image, on the paper according to the electrophotographic process shown in FIG. 4.

Figure 8:
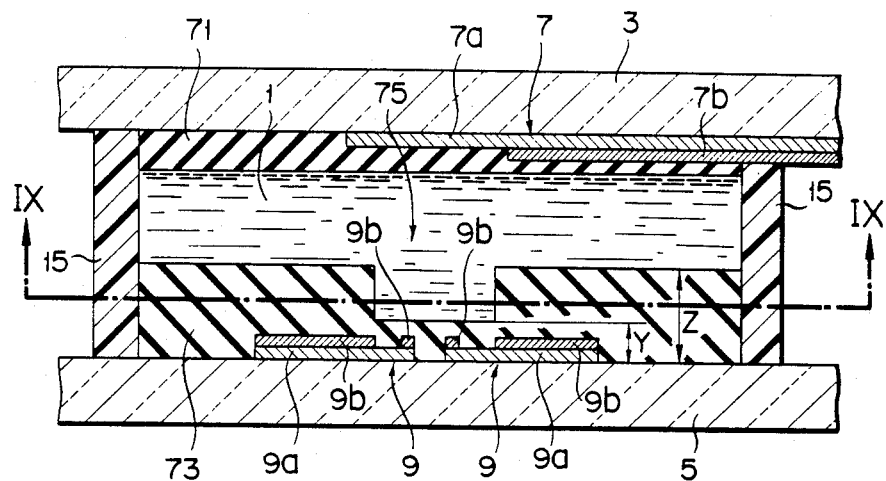
FIG. 8 is a sectional view showing the arrangement of a second embodiment according to the present invention.

A second embodiment of the present invention will be described in reference to FIGS. 8 and 9. The same parts as those in FIGS. 2 and 3 will be represented by the same reference numerals and detailed description on the parts will be omitted.

Figure 9:
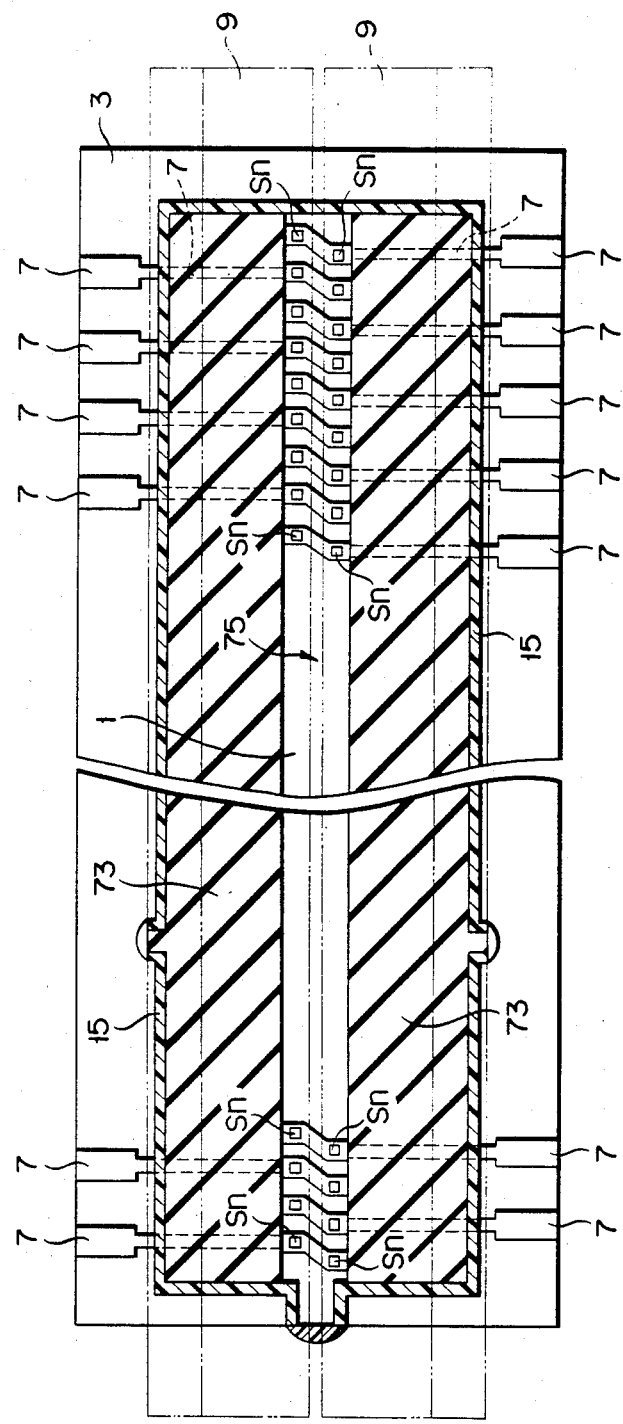
FIG. 9 is a sectional view taken along a line IX—IX in FIG. 8.

A plurality of light shutters Sn are provided, as shown in FIG. 9. The shutters Sn, similar to those in the first embodiment, are of square dots arranged in stagger. The liquid crystal material is of the Gest-Host type. A pair of the glass substrates 3 and 5 are opposed to each other, sandwiching the liquid crystal 1 between them. A plurality of the signal electrodes 7 which extend in the vertical direction in FIG. 9 are formed on the inner surface of glass substrate 3. The plural scanning electrodes 9 which extend in the horizontal direction in FIG. 9 are formed on the inner surface of the other glass substrate 5. The light shutters Sn are formed by the part of those portions of the signal and scanning electrodes 7 and 9 which and overlap with the liquid crystal material 1 therebetween. The signal electrode 7 comprises the transparent electrode 7a and the metal layer 7b. Similarly, the scanning electrode 9 comprises the transparent electrode 9a and the metal layer 9b. The conductive metal layers 7b and 9b are formed on the transparent electrodes 7a and 9a other than the areas of the transparent electrodes 7a and 9a on which the shutters Sn have been formed. An insulating layer 71 is formed all over the inner surface of the glass substrate 3. Another insulating layer 73 is formed on the inner surface of the glass substrate 5. An aligning treatment, such as rubbing, is applied to the surfaces of the insulating layers 71 and 73. The sealing member 15 which seals the liquid crystal 1 is provided at the circumferential edge portions of the glass substrates 3 and 5.

The insulating layers 71 and 73 are made of a material which has a dielectric constant much smaller than that of the liquid crystal material 1. The insulating layers 71 and 73 are made of an organic compound such as polyimide or inorganic compound such as silicon dioxide ($SiO_2$) and titanium dioxide ($TiO_2$). The insulating layer 71 is formed thin and uniform on the upper glass substrate 3. On the other hand, the insulating layer 73 is different in thickness at the area thereof which corresponds to a shutter portion 75 and at the other remaining area thereof. The shutter portion 75, similar to the one in the first embodiment, represents a portion in which the shutters Sn are included and which is adjacent to the shutters Sn. The insulating layer 73 is formed thin at the shutter portion 75 while formed thick at the other remaining portion except the shutter portion. The gap between the substrates 3 and 5 is set 5 $\mu$m, thickness y of the insulating layer 73 at the shutter portion 75 0.2 $\mu$m, and thickness z of the insulating layer 73 at the other remaining portion except the shutter portion 75 2 $\mu$m. Therefore, the liquid crystal material 1 is partially different in thickness.

The manner of forming the insulating layer 73 will be described. The insulating layer 73 which has the thickness y is formed on the inner surface of the glass substrate 5. The aligning treatment is applied to the surface of this insulating layer 73. Another insulating layer is further formed on that area in which the shutter section 75 is not included, to thereby cause the thus formed insulating layers to have the thickness z. The thin and thick portions of the insulating layer may be formed simultaneously.

As described above, the insulating layer 73 is different in thickness at the shutter portion 75 and at the other remaining portion. Therefore, the liquid crystal material 1, sufficient in thickness, exists at the shutter section 75, thereby enabling the shutters Sn to be turned on and off. On the other hand, the liquid crystal material 1 becomes thin at the other remaining portion except the shutter portion 75. The electrostatic capacitance between the signal and scanning electrodes 7 and 9 is reduced at the other remaining portion except the shutter portion 75 accordingly. When a signal of high frequency is applied between the signal and scanning electrodes 7 and 9, current flowing through the electrodes 7 and 9 is reduced, thereby enabling heat generated to be retained. In addition, the electrodes 7 and 9 each having a relatively simple structure of forming the metal layers 7b and 9b on the transparent electrodes 7a and 9a can be used. Further, the amount of the liquid crystal material 1 used can be made less to become more economical. Furthermore, the capacitance between the signal and scanning electrodes 7 and 9 can be made smaller and the rising of pulse voltage applied between both of the electrodes 7 and 8 can be thus made faster, thereby enabling the response speed of the liquid crystal to become higher.

A test was carried out to confirm an effect achieved by the liquid crystal device which had the above-described arrangement. The test was conducted in such a way that the two-frequency driving liquid crystal material was sealed in the second example of the liquid crystal device and in the conventional one, respectively, said conventional one having the thin and plain insulating layer 73, and that the signal of high frequency was applied between the electrodes. Temperature was measured at those end portions of the scanning electrodes which were located on the power side. Test conditions were as follows: The length of the shutter portion 75 was set at 15 cm, the size of each of the shutters Sn 100 $\mu$m×100 $\mu$m, the number of the signal electrodes was 650, the width of the signal electrodes was 180 $\mu$m, the number of the scanning electrodes was 2, the width of the scanning electrodes was 3 mm, the number of the shutters was 1300, the relative dielectric constant of the two-frequency driving liquid crystal material was 8 and a square wave of 300 KHz at 25 V was used as the signal of high frequency. All of the shutter Sn were operated simultaneously. This liquid crystal device was fixed in an isothermal vessel at 40° C. In addition, the interval between the substrates 3 and 5 was set at 5 $\mu$m, thickness of the insulating layer 73 was 0.2 $\mu$m at the shutter portion (y) and 2 $\mu$m at the other remaining portion (z). The following test result was obtained under these conditions and also under such a condition that balance was held between heat generated and heat released.

Temperature rise in the case of the second example of the liquid crystal device: 30° C.

Temperature rise in the case of the conventional liquid crystal device: 66° C.

It has been confirmed from the above test result that the temperature rise in the case of the liquid crystal device according to the present invention is less than ½ that of the conventional device and that the liquid crystal device of the present invention can thus achieve a better effect.

The present invention is not limited to this second embodiment. Although the thick insulating layer 73 has been formed in the longitudinal and width directions of the liquid crystal device, respectively, it may be formed only in the longitudinal direction thereof. In addition, the thickness of the insulating layer 73 is not limited to the one in the second embodiment but may be set optionally. Although the insulating layer 73 has been made partially different in thickness, the insulating layer 71 may be made partially different in thickness, too. Although the insulating layer 73 has been made thick at the other remaining portion except the shutter portion 75, it may be made thick at the other remaining portion except the shutters Sn.

Figure 10:
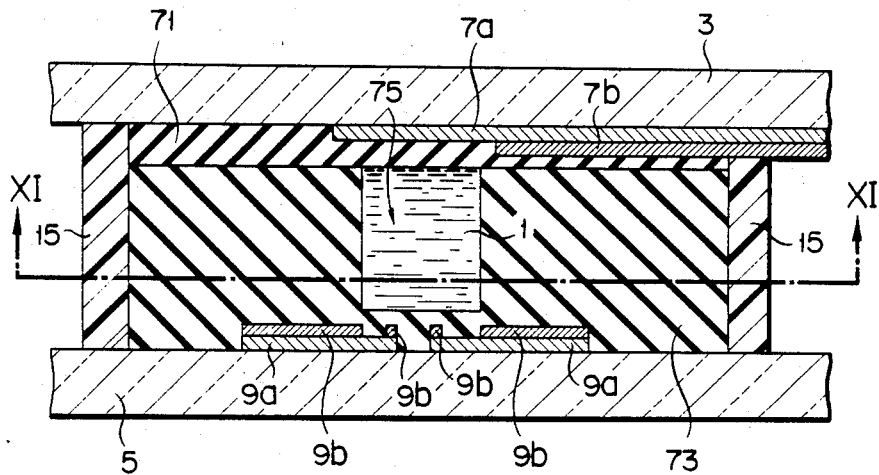
FIG. 10 is a sectional view showing a third embodiment of the liquid crystal device according to the present invention.

A third embodiment of the present invention will be described referring to FIG. 10. The same parts as those in FIGS. 8 and 9 will be denoted by the same reference numerals and description on these parts will be omitted. A sectional view taken along a line XI—XI in FIG. 10 will be omitted because it is similar to FIG. 9.

The characteristic of this third embodiment resides in that the thick portion (z) of the insulating layer 73 in the second embodiment reaches the other insulating layer 71. Therefore, the liquid crystal material 1 exists only at the shutter portion 75. The other remaining portion except the shutter portion 75 is filled with a material which has a small dielectric constant.

The thickness of the insulating layer 73 is about 0.2 $\mu$m at the shutter portion 75 and the liquid crystal material 1, sufficient in thickness, exists at the shutter portion 75, thereby enabling the shutters Sn to control the penetration of light. Since the relative dielectric constant of the insulating layer 73 is sufficiently smaller than that of the liquid crystal material, the capacitance existed between the signal and scanning electrodes 7 and 9 becomes smaller, as compared with the conventional case. Therefore, the amount of heat generated by the electrodes 7 and 9 becomes less, similarly to the case of the second embodiment, when the signal of high frequency is applied between the electrodes 7 and 9. In addition, the structure becomes more durable. The amount of the liquid crystal material used can be made less to become more economical. Further, the response speed of this liquid crystal material becomes higher.

A test was carried out to confirm an effect achieved by the liquid crystal device which had the above-described arrangement. The test was conducted in such a way that the two-frequency driving liquid crystal was sealed in the third example of the liquid crystal device and in the conventional one, respectively, and that the signal of high frequency was applied between the electrodes. Test conditions were as follows: The length of the shutter portion was set at 15 cm, the size of each of the shutters was 100 $\mu$m $\times$ 100 $\mu$m (in a stagger arrangement), the number of the signal electrodes was 650, the width of the signal electrodes was 180 $\mu$m, the number of the scanning electrodes was 2, the width of the scanning electrodes was 3 mm, the number of the shutters was 1300, and the dielectric constant of the two-frequency driving liquid crystal was 8. A square wave of 300 KHz at 25 V was used as the signal of high frequency. All of the shutters Sn were operated simultaneously. The third example of the liquid crystal device was fixed in an isothermal vessel at 40° C. The thickness of the insulating layer 73 was set 0.2 $\mu$m at the shutter portion and 5 $\mu$m at the other remaining portion (thick portion) except the shutter portion. The following test result was obtained under these conditions and also under such a condition that balance was held between heat generated and heat released.

Temperature rise in the liquid crystal device according to the present invention: 25° C.

Temperature rise in the conventional liquid crystal device: 66° C.

It has been confirmed from the above test result that the temperature rise in the liquid crystal device according to the present invention is less than $\frac{1}{2}$ and that the liquid crystal device of the present invention can achieve an excellent effect.

It should be understood that the present invention is not limited to the above-described embodiments but can be modified variously. Although the first through third embodiments of the present invention have been described citing the case where the present invention is applied to the liquid crystal device of the Gest-Host type, it can be applied to the liquid crystal device of the Twisted-Nematic (TN) type.

What is claimed is:

1. A liquid crystal device comprising:
   a pair of liquid crystal substrates opposed to each other;
   at least one first electrode formed on the inner surface of one of the paired liquid crystal substrates;
   at least one second electrode formed on the inner surface of the other paired liquid crystal substrates;
   a liquid crystal material interposed between the paired substrates and cooperating with a part of those portions of the first and second electrodes which are opposed to each other, so as to form at least one light shutter;
   a sealing member formed between the paired substrates, enclosing at least an area which is filled with the liquid crystal material; and
   electrostatic capacitance reducing means provided at least in part of that portion between the first and second electrodes other than where the light shutter is formed, and including at least a material which has a dielectric constant smaller than that of the liquid crystal material.

2. A liquid crystal device according to claim 1, wherein each of the first and second electrodes comprises a shutter electrode section which forms the light shutter and a lead electrode section which supplies at least one driving signal to the shutter electrode section, and that said electrostatic capacitance reducing means are provided at least between those portions of the lead electrode sections of the first and second electrodes which are opposed to each other.

3. A liquid crystal device according to claim 1, wherein said electrostatic capacitance reducing means includes a gas.

4. A liquid crystal device according to claim 1, wherein said electrostatic capacitance reducing means includes an organic insulating material.

5. A liquid crystal device according to claim 1, wherein said electrostatic capacitance reducing means includes an inorganic insulating material.

6. A liquid crystal device according to claim 1, wherein said electrostatic capacitance reducing means comprises the inner sealing member formed between the paired substrates inside the sealing member to seal the liquid crystal material between the first and second electrodes so as to enable the light shutter to be formed; and the insulating material interposed in an area which is defined by the sealing member, inner sealing member and paired substrates and having a dielectric constant smaller than that of the liquid crystal material.

7. A liquid crystal device according to claim 6, wherein the insulating material which has a dielectric constant smaller than that of the liquid crystal material is air.

8. A liquid crystal device according to claim 6, wherein the inner sealing member and sealing member are made of a material which has a dielectric constant smaller than that of the liquid crystal material, and that the insulating material which has a dielectric constant smaller than that of the liquid crystal material is the same material as the one of which the inner sealing member is made, and formed integral to the inner sealing member and sealing member.

9. A liquid crystal device according to claim 1, wherein the electrostatic capacitance reducing means is an insulating layer formed at least on one of the paired substrates and made of a material which has a dielectric constant smaller than that of the liquid crystal material, and that the insulating layer is formed to have a first thickness between those portions of the first and second electrodes where the light shutter is formed, and a second thickness, which is larger than the first thickness, at least at a part between those portions of the first and second electrodes other than where the light shutter is formed.

10. A liquid crystal device according to claim 9, wherein that portion of the insulating layer which has the second thickness extends to the other substrate.

11. A liquid crystal device according to claim 9, wherein the insulating layer is made of a synthetic resin which has a dielectric constant smaller than that of the liquid crystal material.

12. A liquid crystal device comprising:
a pair of liquid crystal substrates opposed to each other;
at least one signal electrode formed on the inner surface of one of the paired liquid crystal substrates;
at least one scanning electrode formed on the inner surface of the other paired liquid crystal substrates;
a liquid crystal material interposed between the substrates and cooperating with the signal and scanning electrodes to form plural liquid crystal micro-shutters;
a first sealing member for sealing the liquid crystal material in such a way that the liquid crystal material exists only in a shutter section where the liquid crystal micro-shutters are formed;
a second sealing member surrounding the first sealing member and formed between the liquid crystal substrates; and
a material sealed in an area which is defined by the substrates, first and second sealing members, and having a dielectric constant smaller than that of the liquid crystal material.

13. A liquid crystal device comprising:
a pair of liquid crystal substrates opposed to each other;
at least one signal electrode formed on the inner surface of one of the paired liquid crystal substrates;
at least one scanning electrode formed on the inner surface of the other paired liquid crystal substrates;
a liquid crystal material interposed between the substrates and cooperating with the signal and scanning electrodes to form plural liquid crystal micro-shutters;
a sealing means provided between the substrates, so as to seal the liquid crystal material between the substrate; and
an insulating layer formed at least in part of that portion between said signal electrode and scanning electrode opposed to each other and other than where said liquid crystal micro-shutters are formed and having a dielectric constant smaller than that of the liquid crystal material, said insulating layer being formed to have a first thickness at the shutter section and a second thickness substantially larger than the first thickness at the other area except the shutter section, and said shutter section denoting a predetermined area where the shutters are formed.

* * * * *